US006807144B2

United States Patent
Kim et al.

(10) Patent No.: US 6,807,144 B2
(45) Date of Patent: Oct. 19, 2004

(54) OPTICAL RECORDING MEDIUM RECORDABLE ON LAND AND GROOVE TRACKS

(75) Inventors: Tae-kyung Kim, Seoul (KR); Young-man Ahn, Gyeonggi-do (KR); Chong-sam Chung, Gyeonggi-do (KR); Jin-kyung Lee, Gyeonggi-do (KR); Jong-bae Kim, Seoul (KR); Du-seop Yoon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 321 days.

(21) Appl. No.: 10/157,014

(22) Filed: May 30, 2002

(65) Prior Publication Data

US 2003/0002430 A1 Jan. 2, 2003

(30) Foreign Application Priority Data

May 30, 2001 (KR) ........................................ 2001-30082

(51) Int. Cl.[7] .................................................. G11B 7/00
(52) U.S. Cl. ................................ 369/275.4; 369/59.25; 369/47.1
(58) Field of Search ........................... 369/275.1, 275.3, 369/275.4, 47.1, 47.15, 47.21, 47.27, 53.1, 53.2, 59.1, 59.25

(56) References Cited

U.S. PATENT DOCUMENTS

| 5,645,909 A | * | 7/1997 | Kobayashi et al. | ...... 369/275.4 |
| 6,054,199 A | * | 4/2000 | Sugiyama et al. | ....... 369/275.4 |
| 6,295,271 B1 | * | 9/2001 | Inui et al. | ................. 369/275.4 |
| 6,671,238 B1 | * | 12/2003 | Ko et al. | .................... 369/47.1 |

* cited by examiner

Primary Examiner—Muhammad Edun
(74) Attorney, Agent, or Firm—Staas & Halsey LLP

(57) ABSTRACT

An optical recording medium having groove tracks and land tracks, first wobbles formed along both sidewalls of each of the groove tracks, second wobbles formed along both sidewalls of each of the land tracks and which are independent of the formation of the first wobble. A middle portion is formed at a predetermined position on each of the sidewalls between adjacent pairs of the land and groove tracks. This optical recording medium can significantly reduce the non-recordable area as compared to conventional optical recording media, resulting in a great improvement in recording density.

29 Claims, 7 Drawing Sheets

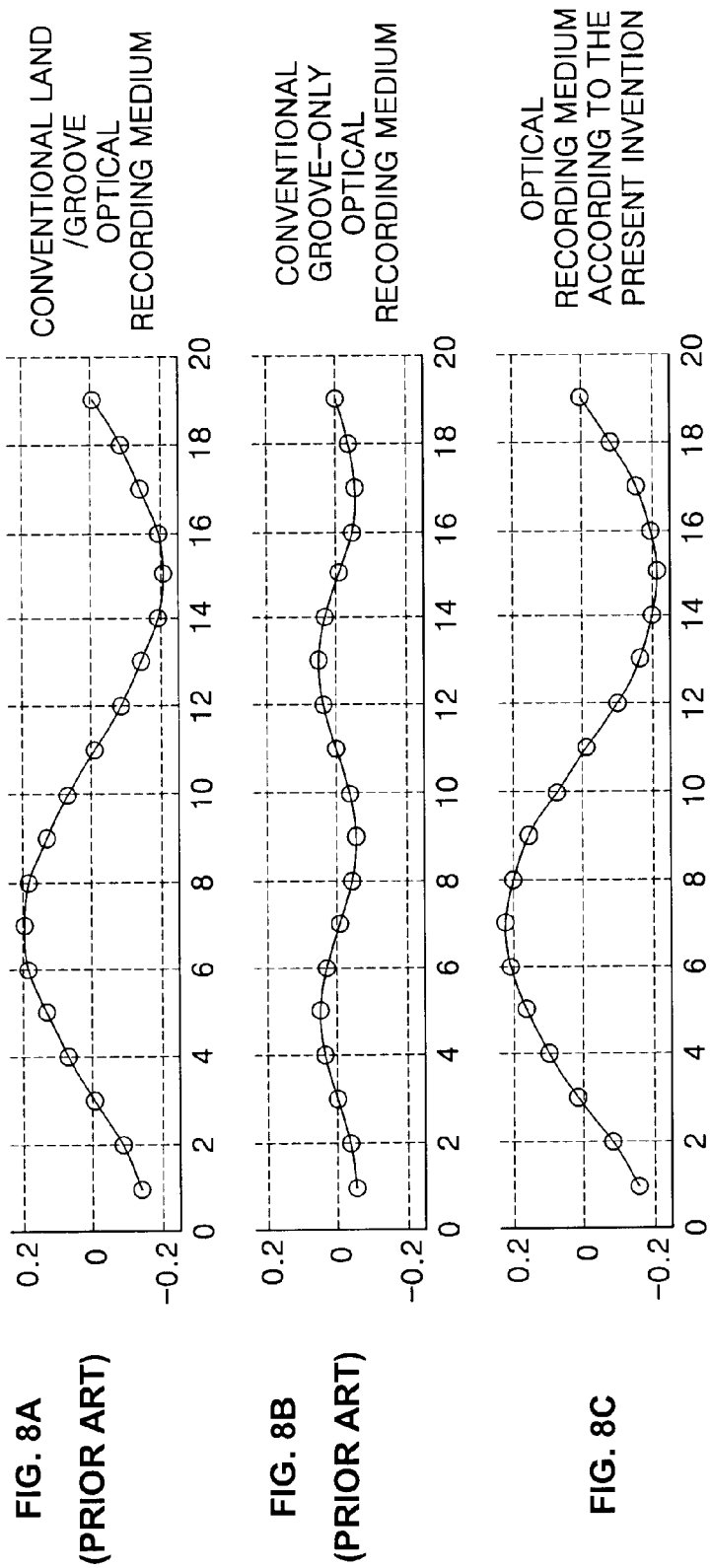

OPTICAL RECORDING MEDIUM RECORDABLE ON LAND AND GROOVE TRACKS

CROSS-REFERENCE TO RELATED APPLICATION

This application claims the benefit of Korean Application No. 2001-30082, filed May 30, 2001, in the Korean Intellectual Property Office, the disclosure of which is incorporated herein by reference.

BACKGROUND OF THE INVENTION

1. Field of the Invention

The present invention relates to optical recording media recordable on land and groove tracks, and more particularly, to an optical recording medium having an improved structure to compensate for defects of conventional land/groove optical recording media.

2. Description of the Related Art

DVD-RAM optical recording media use a land/groove recording method by which user data is written both on land and groove tracks. FIG. 1 illustrates a part of a conventional land/groove optical recording medium 1 capable of performing the above operation. DVD-RAM optical recording media, which are a type of the land/groove optical recording medium 1, are manufactured to have grooves of $\lambda/6$ in depth to minimize cross talk between adjacent tracks. Here, $\lambda$ denotes the wavelength of an optical source that is used to record and/or reproduce DVD-RAM optical recording media.

The land/groove optical recording medium 1 has a track pitch about twice as long as the pitch of groove-only optical recording media that record user data only on grooves. Here, the track pitch denotes the distance between groove tracks G'. Therefore, $\pm 1^{st}$-order diffracted light beams, from light projected onto the land/groove optical recording medium 1 and diffracted by the land/groove structure, enter the inner side of the exit pupil of an objective lens, as compared to groove-only optical recording media. Accordingly, it is well known that the land/groove optical recording medium 1 can obtain a push-pull signal of sufficient magnitude. That is, the land/groove optical recording medium 1 can obtain a tracking error signal of sufficient magnitude.

As shown in FIG. 1, during manufacturing of the land/groove optical recording medium 1, a wobble signal is molded into the groove tracks G' and/or the land tracks L' using changes in the amplitude direction. The wobble signal is used to control the rotating speed of the optical recording medium 1 and to obtain synchronization information of the optical recording medium 1. In the land/groove optical recording medium 1, user data is recorded both on the land tracks L' and on the groove tracks G'. The frequency-modulated or phase-modulated wobble is simply formed into both sidewalls of each of the groove tracks G'. Thus, it is impossible to record address information to recognize physical locations on the optical recording medium 1.

In order to record address information, as shown in FIG. 2, the optical recording medium 1 such as a DVD-RAM has rugged pre-pits 3 formed on its header area using a complementary allocated pit address (CAPA) method. A track pitch is less than the size of a light spot. Thus, as shown in FIG. 2, the CAPA method forms pre-pits in the header area on the border of adjacent tracks at intervals of two tracks in order to minimize the influence upon the pre-pits of adjacent tracks. Here, a wobble signal and an address signal can be obtained from a push-pull signal, which is obtained by performing a differential operation on detected signals. The detected signals are obtained by dividing the light beams reflected/diffracted by the land/groove optical recording medium 1 into two parts in the radial direction of the optical recording medium 1, and by detecting electrical signals from the two reflected/diffracted light beam parts.

However, as described above with respect to the DVD-RAM optical recording medium as an example, the conventional land/groove optical recording medium 1 generally has the pre-pits 3 formed in the header area to record address information. Therefore, the recording density is reduced by the pre-pit area formed to record the address information. In addition, the grooves and the pre-pits are mixed up on the conventional land/groove optical recording medium 1 such that the light amount from the light beams reflected by the optical recording medium varies depending on the positions on the optical recording medium 1 irradiated by the light beam. Thus, it is impossible to achieve multi-layered recording.

SUMMARY OF THE INVENTION

To solve the above and other problems, it is an object of the present invention to provide an optical recording medium having an improved structure such that a recordable area (user data area) can be increased by a reduction of a non-recordable area (overhead).

To solve the above and other problems, it is another object of the present invention to provide an optical recording medium having an improved structure to have the merits of conventional land/groove optical recording media and those of groove-only optical recording media, and which uses a wobble addressing technique to record a wobble signal with address information.

Additional objects and advantages of the invention will be set forth in part in the description which follows and, in part, will be obvious from the description, or may be learned by practice of the invention.

In order to achieve the above and other objects of the present invention, an optical recording medium having groove tracks and land tracks according to an embodiment of the invention includes a first wobble formed close to a groove track along both sidewalls of a groove track and a second wobble formed close to a land track along both sidewalls of a land track independently of the formation of the first wobble.

According to an aspect of the invention, the optical recording medium further includes a middle portion formed at a predetermined position on the sidewall between adjacent land and groove tracks, the middle portion to divide the area where the first wobble is formed and the area where the second wobble is formed.

In order to achieve the above and other objects of the present invention, an optical recording medium having groove tracks and land tracks according to another embodiment includes a middle portion formed at a predetermined position on the sidewall between adjacent land and groove tracks.

According to another aspect of the invention, the optical recording medium further includes a first wobble formed on the sidewall between a groove track and the adjacent middle portion, and a second wobble formed on the sidewall between a land track and the adjacent middle portion.

According to a further aspect of the invention, wobble signals carrying address information are recorded on the first and second wobbles.

According to a still further aspect of the invention, bi-phase-modulated wobble signals, frequency-modulated wobble signals and/or amplitude-modulated wobble signals are recorded on the first and second wobbles.

According to a yet further aspect of the invention, the address information recorded on the first wobble is detected during groove track scanning and the address information recorded on the second wobble is detected during land track scanning.

BRIEF DESCRIPTION OF THE DRAWINGS

The above and other objects and advantages of the present invention will become more apparent and more readily appreciated by describing in detail embodiments thereof with reference to the accompanying drawings in which:

FIGS. 8A to 8C are graphs showing a push-pull signal for the conventional land/groove optical recording medium, the conventional groove-only optical recording medium, and the optical recording medium according to an embodiment of the present invention having the reflection/diffraction properties as shown in FIGS. 5 through 7, respectively.

DETAILED DESCRIPTION OF THE EMBODIMENTS

Figure 1:
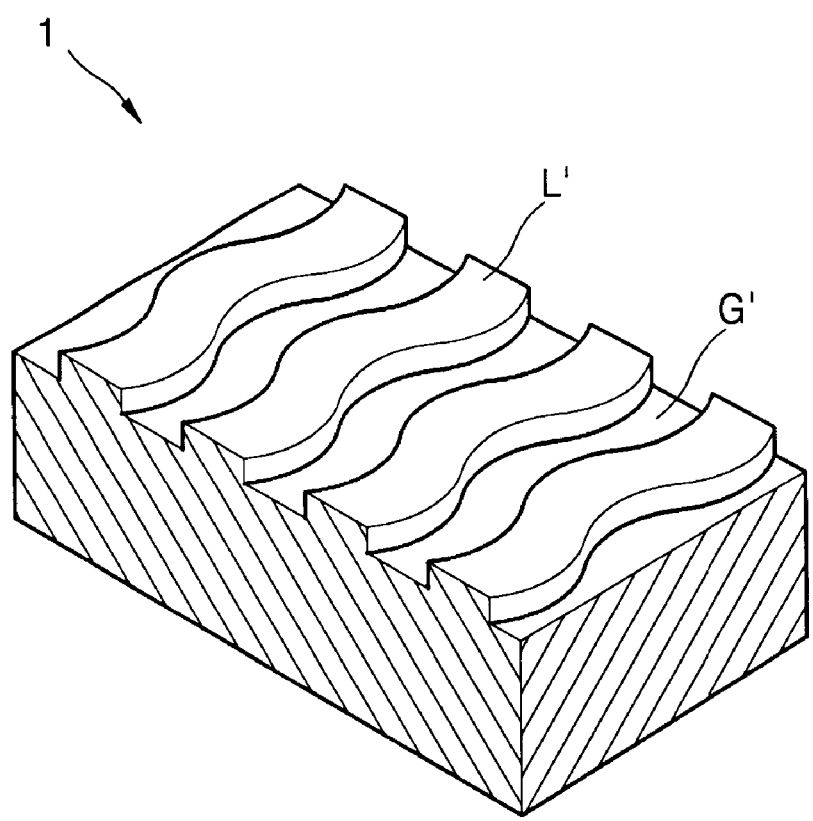
FIG. 1 is a perspective view of a part of a conventional land/groove optical recording medium.
Figure 2:
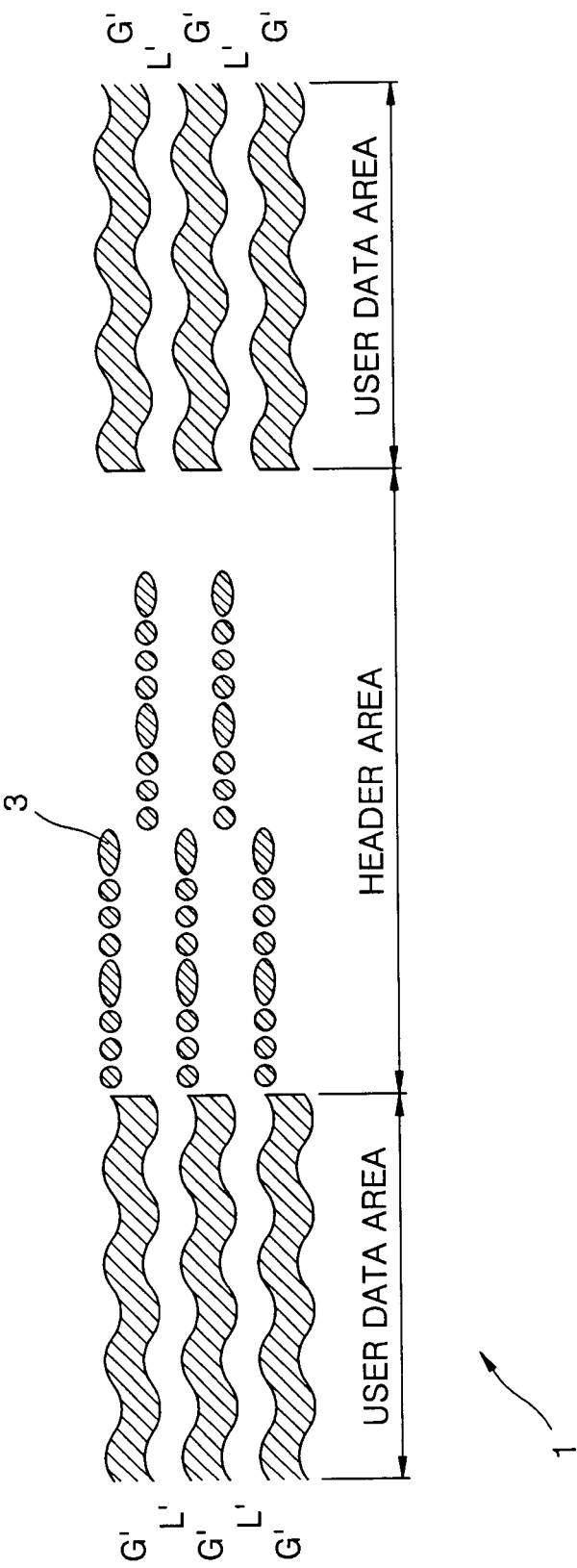
FIG. 2 is a schematic view of the header area of the conventional land/groove optical recording medium of FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
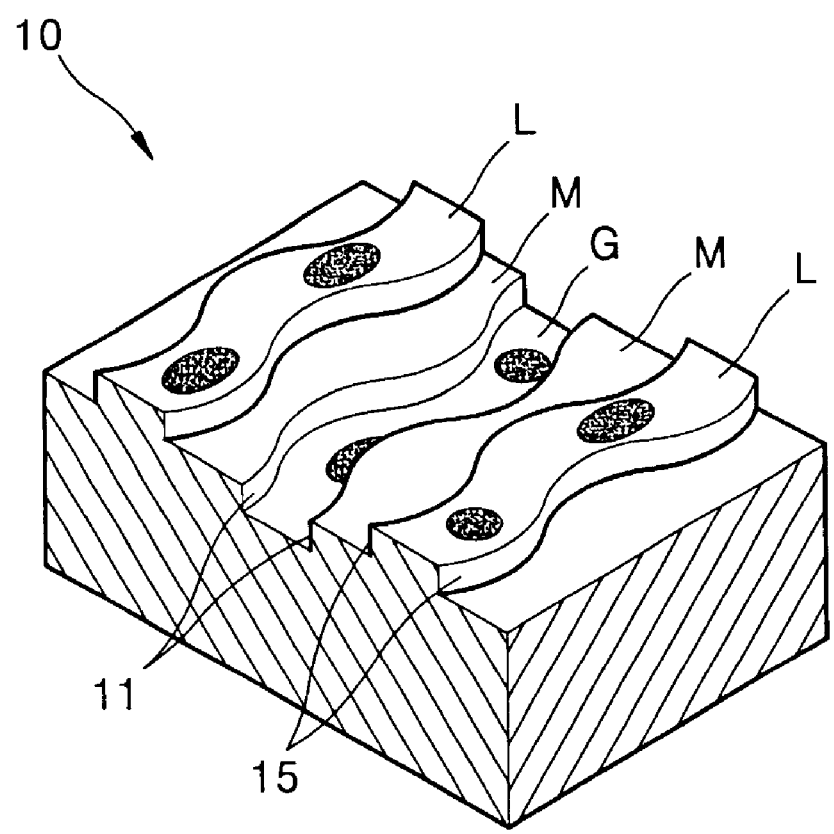
FIG. 3 is a perspective view of a part of an optical recording medium according to an embodiment of the present invention.

Referring to FIG. 3, an optical recording medium 10 according to an embodiment of the present invention can record user data on groove tracks G and land tracks L. A first wobble 11 is formed on both sidewalls of a corresponding groove track G to be close to the groove track G. A second wobble 15 is formed close to a corresponding land track L on both sidewalls of the land track L. A middle portion M is also formed at a predetermined position on the sidewall between adjacent pairs of the land and groove tracks L and G so that the region where the first wobble 11 is formed is distinguished from the region where the second wobble 15 is formed.

According to an embodiment of the invention, the first and second wobbles 11 and 15 embed a wobble signal which carries the address information. The address information recorded on the first wobble 11 is detected during scanning of the groove tracks G. The address information recorded on the second wobble 15 is detected during scanning of the land tracks L. The detection of the address information recorded on the first wobble 11 is independent of the detection of the address information recorded on the second wobble 15.

Figures 4A, 4B, 4C:
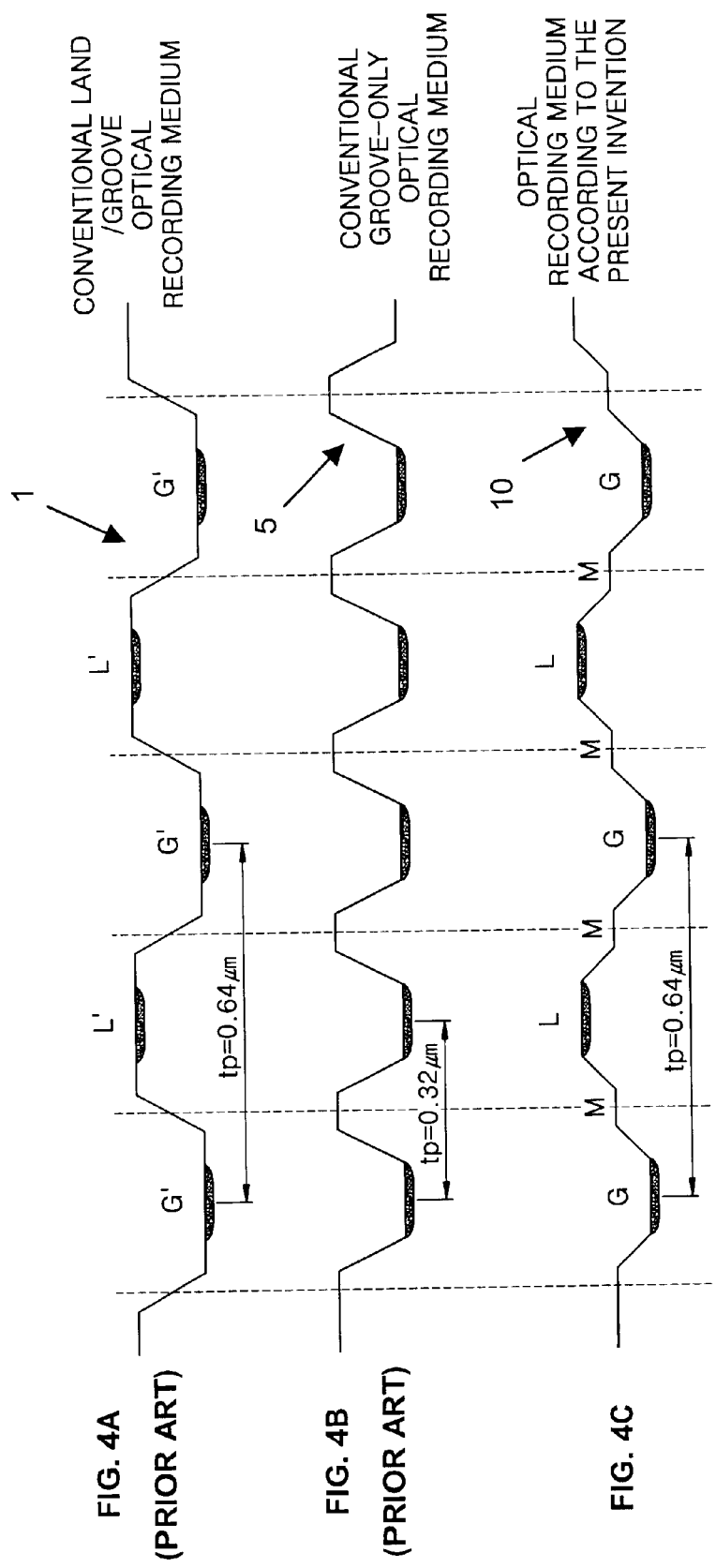
FIGS. 4A to 4C are partial cross-sectional views comparing the structures of the conventional land/groove optical recording medium, the conventional groove-only optical recording medium, and the optical recording medium according to an embodiment of the present invention, and the track pitches of the three types of optical recording media according to their structures.

As shown in FIGS. 3 and 4C, the optical recording medium 10 has a structure in which the independent first and second wobbles 11 and 15 are formed on the sidewall between adjacent land and groove tracks L and G in the depth direction of a groove. The address information of the groove track G is added to a wobble signal of the first wobble 11 and recorded on the first wobble 11. The address information of the land track L is added to a wobble signal of the second wobble 15 independent of the wobble signal of the first wobble 11 and is recorded on the second wobble 15. Thus, the optical recording medium 10 according to an embodiment of the present invention having this structure can minimize its non-recordable area and increase its recordable area as compared to the conventional land/groove optical recording medium 1, which records address information in pre-pits formed in the header area.

The recording of address information on the first and second wobbles 11 and 15 is achieved by techniques used in the technical field of the present invention. According to embodiments of the invention, the recording techniques include phase modulation, frequency modulation, and/or amplitude modulation. For example, as shown in the embodiment in FIG. 3, the optical recording medium 10 records the wobble signal is bi-phase modulated with respect to each of the land tracks L and the groove tracks G. Specifically, a bi-phase shift keying (BPSK) wobble signal is used to record the address information on the first and second wobbles 11 and 15.

According to an aspect of the invention, in the optical recording medium 10, the groove track G is formed at a distance of λ/6 apart from the land track L so as to minimize the cross talk occurring between adjacent tracks G and L. However, it is understood that the distance can be altered as needed.

The optical recording medium 10 according to the present invention has such a structure as to have the advantages of the conventional land/groove optical recording medium 1 and those of a conventional groove-only optical recording medium 5 shown in FIGS. 4A to 4C.

Referring to FIGS. 4A to 4C, the optical recording medium 10 according to an embodiment of the present invention has a track pitch (tp) approximately twice the size of the track pitch of the conventional groove-only optical recording medium 5. Thus, the optical recording medium 10 obtains a push-pull signal of sufficient magnitude (i.e., a tracking error signal) similar to the conventional land/groove optical recording medium 1. In addition, a track pitch of the conventional land/groove optical recording medium 1 (i.e., tp=0.64 $\mu$m) is twice the size of a track pitch of the conventional groove-only optical recording medium 5 (i.e., tp=0.32 $\mu$m). The track pitch of the land/groove optical recording medium 1 is roughly the same as a track pitch of the optical recording medium 10 (i.e., tp=0.64 $\mu$m). It is understood that, in practice, the track pitch of the conventional land/groove optical recording medium 1 is slightly less than double the track pitch of the conventional groove-only optical recording medium 5.

Figure 5:
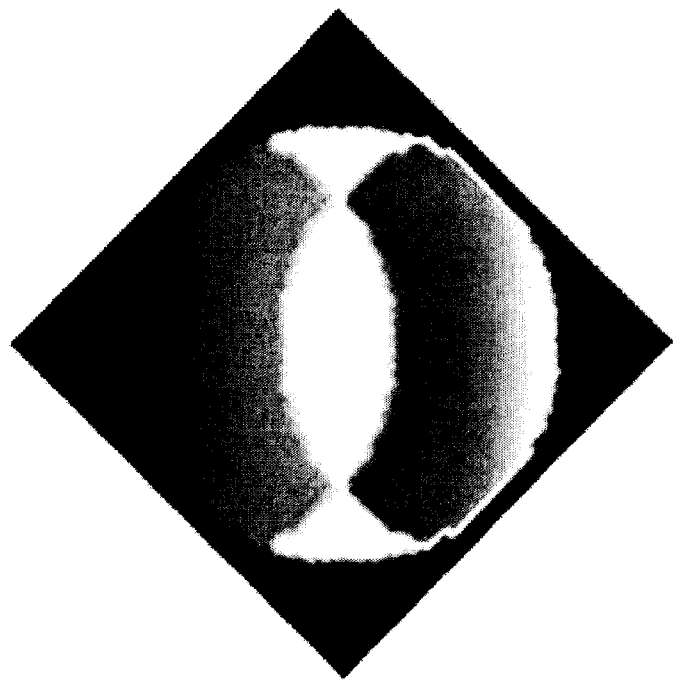
FIGS. 5 through 7 show the baseball patterns of the light beams reflected/diffracted by the conventional land/groove optical recording medium, the conventional groove-only optical recording medium, and the optical recording medium of FIGS. 4A to 4C, the light beams being observed from the exit pupil of an objective lens.
Figure 6:
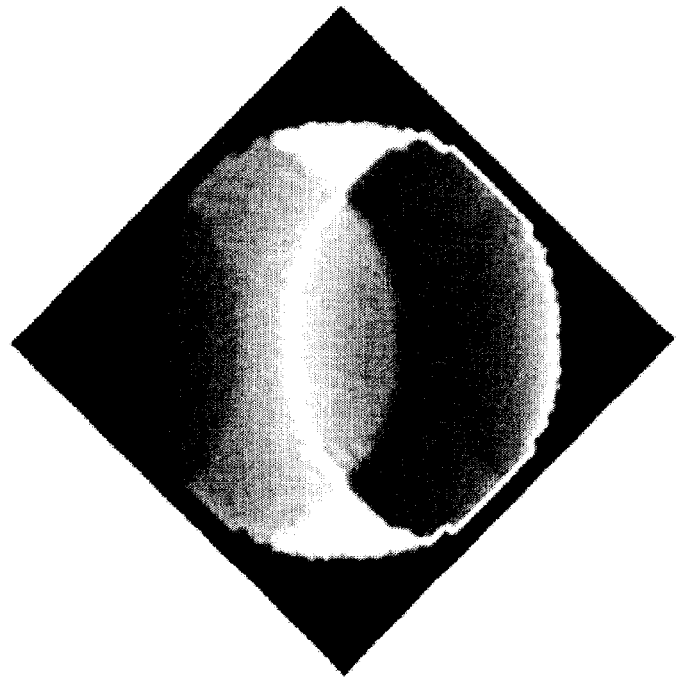
Figure 7:
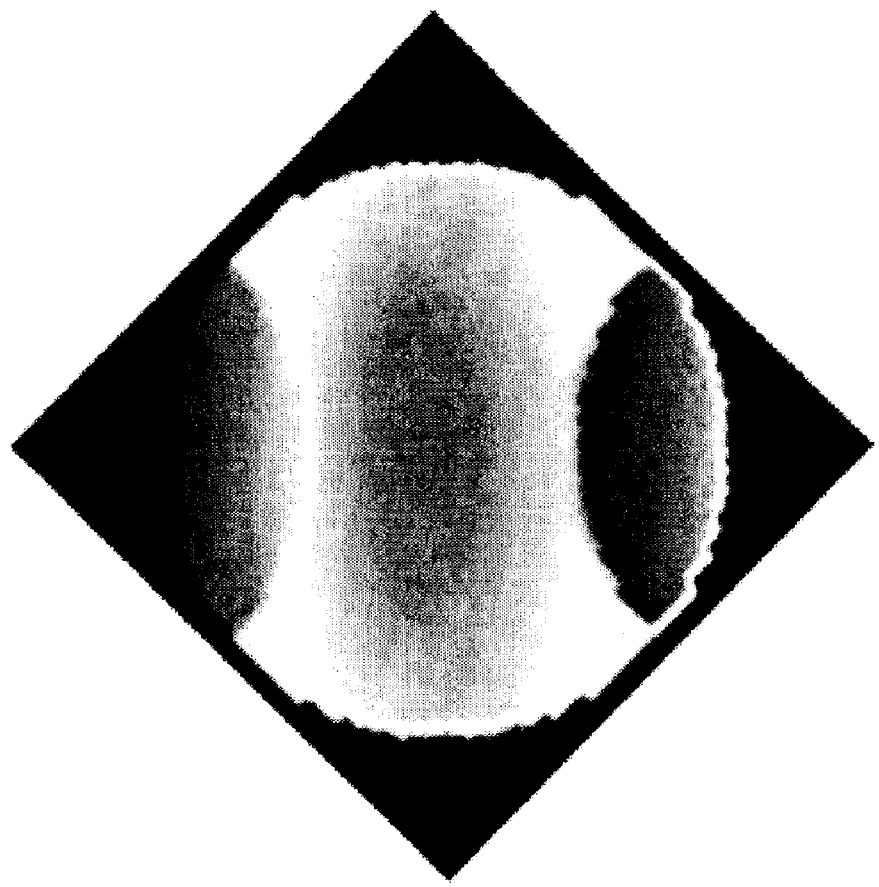

FIGS. 5 through 7 show the baseball patterns of light beams reflected/diffracted by the conventional land/groove optical recording medium 1, the conventional groove-only optical recording medium 5, and the optical recording medium 10, wherein the light beams are observed through the exit pupil of an objective lens (not shown). As described above, since the land/groove optical recording medium 1 has a longer track pitch than the track pitch of the conventional groove-only optical recording medium 5, more of the ±1st-order light beams reflected/diffracted by the conventional land/groove optical recording medium 1 enter the exit pupil of an objective lens than the case of the conventional groove-only optical recording medium 5.

For example, as shown in FIG. 5, ±1st-order light beams reflected/diffracted by the conventional land/groove optical recording medium 1 overlap at the center of the exit pupil of the objective lens. On the other hand, as shown in FIG. 6, ±1st-order light beams reflected/diffracted by the conventional groove-only optical recording medium 5 do not overlap. When the optical recording medium 10 has a track pitch with the same length as the track pitch of the land/groove optical recording medium 1 applied to FIG. 5, we can see from FIG. 7 that ±1st-order light beams reflected/diffracted by the optical recording medium 10 overlap at the center of the exit pupil of an objective lens, similar to the overlap found in the land/groove optical recording medium 1. Further, the ±1st-order light beams appear at the periphery of the exit pupil due to the existence of the middle portion M, which is similar to the conventional groove-only optical recording medium 5.

FIGS. 8A to 8C are graphs showing a push-pull signal for the conventional land/groove optical recording medium 1, the conventional groove-only optical recording medium 5, and the optical recording medium 10 having the reflection/diffraction properties as shown in FIGS. 5 through 7, respectively. The inventor of the present invention confirmed that, when the peak-to-peak signal size of a push-pull signal for the land/groove optical recording medium 1 is set to be 100%, the conventional groove-only optical recording medium 5 obtains a push-pull signal of about 25% and the optical recording medium 10 according to the present invention obtains a push-pull signal of about 110%. Thus, the optical recording medium 10 according to the present invention acquires a tracking signal of sufficient magnitude.

Table 2 shows the data-to-data jitter representing the influence of cross talk between adjacent tracks upon the conventional groove-only optical recording medium 5 and the optical recording medium 10 according to track pitches, based on the conditions of Table 1. As presented in Table 2, the optical recording medium 10 according to an embodiment of the present invention has a data-to-data jitter value about 1–2% less than that of the conventional groove-only optical recording medium 5.

TABLE 1

| Wavelength | 400 nm |
| --- | --- |
| Numeral exit pupil (NA) of objective lens | 0.85 |
| Minimal mark length | 0.185 μm |

TABLE 2

| Track pitch | 0.32 μm | 0.30 μm |
| --- | --- | --- |
| Conventional groove-only optical recording medium 5 | 7.79% | 7.87% |
| Optical recording medium 10 | 5.91% | 6.58% |

The track pitch in Table 2 denotes the distance between mark rows. That is, in Table 2, the track pitch of the conventional groove-only optical recording medium 5 denotes the distance between groove tracks, and the track pitch of the optical recording medium 10 denotes the distance between a groove track G and a land track L. As shown in Table 2, the optical recording medium 10 is less affected by cross talk. Hence, the optical recording medium 10 has an advantage in increasing the linear density in the track direction by a reduction of the track pitch and/or in guaranteeing a system margin.

As described above, similar to the conventional land/groove optical recording medium 1, the optical recording medium 10 is less affected by cross talk from adjacent tracks. Therefore, the optical recording medium 10 obtains a push-pull signal of sufficient magnitude. In addition, similar to the conventional groove-only optical recording medium 5, the optical recording medium 10 records address information in wobbles. Thus, the optical recording medium 10 minimizes the non-recordable area so to acquire a larger recordable area than the conventional land/groove optical recording medium 1.

On the other hand, the conventional land/groove optical recording medium 1 is known to present a disadvantage when compared to the conventional groove-only optical recording medium 5 in the cross writing between adjacent tracks, such as cross erasing. Appropriate selection of the structure and material of a recording film of an optical recording medium 1 can reduce the cross writing, but also decreases the recording speed. According to the technical field of the present invention, if the conventional land/groove optical recording medium 1 is manufactured to reduce cross writing, the recording speed decreases, and, if it is manufactured to increase the recording speed, it has a disadvantage in cross writing.

However, compared to the conventional land/groove optical recording medium 1, since the optical recording medium 10 according to the present invention has a middle portion M, it is expected that the optical recording medium 10 limits the cross writing property.

An optical recording medium according to the present invention as described above includes a first wobble formed close to a groove track along both sidewalls of the groove track and a second wobble formed close to a land track along both sidewalls of the land track. Thus, the optical recording medium can record wobble signals carrying address information in the first and second wobbles. Accordingly, the optical recording medium according to the present invention can significantly decrease the non-recordable area compared to conventional land/groove optical recording media, resulting in a great improvement in recording density. Also, the optical recording medium according to the present invention adds address information to a wobble signal and records the wobble signal carrying the address information, so that it can remarkably reduce the pre-pits formed in the header area compared to conventional land/groove optical recording media. Thus, the optical recording medium according to the present invention presents the advantage of a multi-layer recording when compared to conventional land/groove optical recording media.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical recording medium comprising:
   groove tracks;
   land tracks, each of said land tracks being disposed above said groove tracks and having sidewalls between adjacent ones of said groove tracks;
   first wobble signals formed close to corresponding said groove tracks along the sidewalls adjacent each of said groove tracks; and
   second wobble signals formed close to said land tracks along the sidewalls adjacent each of said land tracks,
   wherein said second wobble signals are independent of said first wobble signals.

2. The optical recording medium of claim 1, further comprising middle portions extending from a predetermined position on each of the sidewalls common to adjacent pairs of said land and groove tracks, each said middle portion comprising an area defined between an adjacent pair of said first wobble and said second wobble signals.

3. The optical recording medium of claim 2, wherein said first and second wobble signals comprise address information.

4. The optical recording medium of claim 3, wherein said first and second wobble signals comprise bi-phase-modulated wobble signals, frequency-modulated wobble signals and/or amplitude-modulated wobble signals.

5. The optical recording medium of claim 3, wherein:
the address information recorded on said first wobble signals are disposed to be detected during groove track scanning, and
the address information recorded on said second wobble signals are disposed to be detected during land track scanning.

6. The optical recording medium of claim 1, wherein said first and second wobble signals comprise address information.

7. The optical recording medium of claim 6, wherein said first and second wobble signals comprise bi-phase-modulated wobble signals, frequency-modulated wobble signals and/or amplitude-modulated wobble signals.

8. The optical recording medium of claim 6, wherein:
the address information recorded on said first wobble signals are disposed to be detected during groove track scanning, and
the address information recorded on said second wobble signals are disposed to be detected during land track scanning.

9. An optical recording medium comprising:
groove tracks;
land tracks disposed above adjacent ones of said groove tracks;
middle portions extending from a predetermined position on a sidewall between adjacent pairs of said land and groove tracks.

10. The optical recording medium of claim 9, further comprising:
a first wobble formed on a sidewall between one of said groove tracks and an adjacent one of said middle portions; and
a second wobble formed on a sidewall between one of said land tracks and an adjacent one of said middle portions.

11. The optical recording medium of claim 10, wherein said first and second wobbles comprise wobble signals carrying address information.

12. The optical recording medium of claim 11, wherein said first and second wobbles comprise bi-phase-modulated wobble signals, frequency-modulated wobble signals and/or amplitude-modulated wobble signals.

13. The optical recording medium of claim 11, wherein:
the address information recorded on said first wobble is disposed to be detected during groove track scanning, and
the address information recorded on said second wobble is disposed to be detected during land track scanning.

14. The optical recording medium of claim 10, wherein said first and second wobbles comprise bi-phase-modulated wobble signals, frequency-modulated wobble signals and/or amplitude-modulated wobble signals.

15. The optical recording medium of claim 9, wherein each said middle portion comprises address information for the adjacent pair of said land and groove tracks.

16. The optical recording medium of claim 15, wherein:
a shape of a surface of each said middle portion is defined by recorded first and second wobble signals, and
the address information for the adjacent pair of said land and groove tracks is recorded in the recorded first and second wobble signals.

17. The optical recording medium of claim 9, wherein a surface of each said middle portion is roughly parallel to surfaces of the corresponding adjacent pair of said land and groove tracks.

18. An optical recording medium comprising:
a groove track having a first area on which first data is recordable;
a land track having a second area on which second data is recordable, said land track being separated from and disposed above said groove track by a side wall;
address information recorded on the sidewall and which includes information used to determine a physical location for one of the first and second areas of said land and groove tracks.

19. The optical recording medium of claim 18, wherein said address information comprises first address information for the first area, and second address information for the second area.

20. The optical recording medium of claim 19, wherein the first address information is disposed between said groove track and the second address information.

21. The optical recording medium of claim 19, wherein the first and second address information are recorded so as to define a surface on the sidewall, the surface being roughly parallel to surfaces of said land and groove tracks which include the first and second areas on which the first and second data are recordable.

22. The optical recording medium of claim 21, wherein said address information is disposed between the first and second areas in a radial direction of the optical recording medium.

23. The optical recording medium of claim 18, wherein said address information is disposed between the first and second areas in a radial direction of the optical recording medium.

24. A method of recording data on an optical recording medium having an adjacent pair of land and groove tracks, the method comprising:
recording first data on the land track;
recording second data on the groove track, the groove track being below the land track;
recording address information on a sidewall separating the adjacent pair of land and groove tracks, the address information providing information used to recognize a physical location of one of the first and second data on the optical recording medium.

25. The method of claim 24, further comprising generating the address information including first and second address information, the first address information comprising information used to recognize the physical location of the first data, and the second address information comprising information used to recognize the physical location of the second data.

26. The method of claim 24, wherein the first address information is recorded in a first wobble signal, and the second address information is recorded in a second wobble signal.

27. The method of claim 26, wherein the first wobble signal comprises one of a bi-phase-modulated wobble signal, a frequency-modulated wobble signal, and an amplitude-modulated wobble signal.

28. The method of claim 26, wherein the second wobble signal comprises one of a bi-phase-modulated wobble signal, a frequency-modulated wobble signal, and an amplitude-modulated wobble signal.

29. The method of claim 26, wherein said recording the address information comprises recording the first and second wobble signals to define a middle surface on the sidewall, the middle surface being roughly parallel with and between surfaces of the land and groove tracks on which the first and second data are recorded.

* * * * *